(12) United States Patent
Engström

(10) Patent No.: US 7,367,229 B2
(45) Date of Patent: May 6, 2008

(54) LIQUID FLOW REGULATING DEVICE AND DYNAMOMETER TESTING DEVICE

(76) Inventor: Nils G Engström, Rönningevägen 3, S-114 61 Rönninge (SE)

( * ) Notice: Subject to any disclaimer, the term of this patent is extended or adjusted under 35 U.S.C. 154(b) by 311 days.

(21) Appl. No.: 10/560,601

(22) PCT Filed: Jun. 13, 2003

(86) PCT No.: PCT/SE03/00995

§ 371 (c)(1),
(2), (4) Date: Dec. 13, 2005

(87) PCT Pub. No.: WO2004/111739

PCT Pub. Date: Dec. 23, 2004

(65) Prior Publication Data

US 2006/0137443 A1    Jun. 29, 2006

(51) Int. Cl.
*G01M 19/00* (2006.01)
(52) U.S. Cl. .................... 73/168; 137/625.17
(58) Field of Classification Search .................. 73/861, 73/168; 137/625.17
See application file for complete search history.

(56) References Cited

U.S. PATENT DOCUMENTS

| | | | |
|---|---|---|---|
| 3,005,468 A | 10/1961 | Erwin et al. | 137/625 |
| 3,940,978 A | 3/1976 | Akkerman et al. | 73/117 |
| 4,066,241 A | 1/1978 | Read | 251/361 |
| 4,161,116 A | 7/1979 | Fegraus et al. | 73/117 |
| 4,479,512 A | 10/1984 | Ohrendorf et al. | 137/625 |
| 4,856,756 A | 8/1989 | Combs | 251/297 |
| 5,170,801 A | 12/1992 | Casper et al. | 128/769 |
| 5,285,536 A | 2/1994 | Long | 4/491 |
| 5,323,644 A | 6/1994 | Schaefer | 73/117 |
| 6,217,004 B1 | 4/2001 | Tanner | 251/209 |
| 6,220,487 B1 | 4/2001 | Srivastava et al. | 222/380 |
| 2002/0079003 A1 | 6/2002 | Scampini | 137/625 |

FOREIGN PATENT DOCUMENTS

| | | |
|---|---|---|
| DE | 20204661 U1 | 9/2003 |
| EP | 0210979 B1 | 2/1989 |
| GB | 603837 | 6/1948 |
| GB | 2158204 A | 11/1985 |
| JP | 2003-42313 | 2/2003 |
| WO | WO01/86113 | 11/2001 |

*Primary Examiner*—Andre J. Allen
(74) *Attorney, Agent, or Firm*—Jacobson Holman PLLC

(57) ABSTRACT

The present invention relates to a regulating device (1) for control of flow and/or pressure, including a housing (3) enclosing a movable inner member (2) which is provided with a passage corresponding to the housing inlet. The inlet comprises at least two ports (4,5,6,7) which are spaced apart with a circumferentially equal distance, and the passage comprises apertures (8,9,10,11) positioned correspondingly. The inner member (2) is fitted with radial play inside the housing so that in operation a leakage of the liquid to be regulated will enter between the inner member and the housing so that these elements are in a floating relationship, whereby the inner member is relieved from radial forces in operation. The invention also concerns a dynamometer testing device.

12 Claims, 4 Drawing Sheets

LIQUID FLOW REGULATING DEVICE AND DYNAMOMETER TESTING DEVICE

This is a nationalization of PCT/SE03/000995 filed 13 Jun. 2003 and published in English.

FIELD OF THE INVENTION

The invention relates to a regulating device, intended for control of liquid flow and/or pressure, of the kind defined in the preamble of claim 1.

The invention further relates to a dynamometer testing device including such a regulating device.

BACKGROUND OF THE INVENTION

Regulating devices that are intended for control of liquid flow and/or pressure, are known in various embodiments.

In certain applications there exists a need to control the flow and/or pressure so that the flow and/or pressure may be accurately set to a desired value. One such application is the field of dynamometer testing of motor vehicles.

Here a testing device is adapted to be drivingly connected to a driven vehicle output shaft and comprises means for measuring one or more quantities significant to the performance of the engine and the transmission, such as the torque that the driven shaft applies to a power-absorbing device forming part of the device.

EP 0 210 979 discloses an device comprising load absorbing means in the form of a hydrostatic pump assembly which has an input shaft adapted to be in engagement with a driven vehicle shaft using a rigid coupling. The pump assembly consists of two pumps that are drivingly interconnected and thus are both driven by the shaft. An adjustable control valve is controlled such that the valve allows the passage of a liquid flow, the volumetric rate of which being related to the desired rotational speed of the rotor, i.e. of the driven vehicle shaft.

A problem with known regulating devices, however, is that they do not provide an accurate control fast enough for certain applications. For example, the known dynamometer testing device can not be used for precise testing of an engine during rapidly changing dynamic processes, such as rapid accelerations, since the response from the control valve cannot be controlled sufficiently fast.

In WO 01/86113 a sleeve valve is described, wherein a sleeve is arranged movably inside a housing. The sleeve and the housing are provided with corresponding apertures for adjustment of the flow by bringing the apertures in and out of correspondence with each other by rotation of the sleeve relative to the housing. This known device is, however., not suitable for dynamic regulation of liquid flows.

SUMMARY OF THE INVENTION

It is an object of the present invention to provide a regulating device that solves the above mentioned problem. In particular it is an object of the invention to provide a regulating device that allows fast and accurate control of dynamic hydraulic flow and/or pressure, such as during very fast processes.

This object is achieved by a regulating device according to the characterized portion of claim 1.

It is a further object of the present invention to provide a dynamometer testing device that solves the above mentioned problems.

This object is achieved by a dynamometer testing device according to claim 11.

The regulating device includes a housing having an axis and a circumferential extension. It is provided with an inlet and an outlet and encloses an inner member which is arranged movably relative to the housing. The inner member is provided with a passage corresponding to the inlet for control of liquid flow and/or pressure.

According to the invention the inlet comprises at least one group of at least two substantially radial ports which are spaced apart with a circumferentially equal distance. The passage comprises substantially radial apertures positioned correspondingly with respect to the ports, whereby the inner member is relieved from radial forces in operation. This is because the force distribution over the circumferential extension of the inner member will be equalised in operation of the device so that there will be no force resultant acting on the inner member.

Further, the inner member is fitted with a minor radial play inside the housing so that in operation a minor leakage of the liquid to be regulated will enter the very thin slit between the inner member and the housing so that these elements are in a floating relationship with each other. The radial play need not be noticeable and, as an example, the radial play could be of a magnitude of about $3/100$-$20/100$ mm.

The separation of the ports and the apertures with a circumferentially equal distance together with the mutual floating relationship of the two components, result in the great advantage that since the inner member becomes relieved in operation, the force needed to displace it relative to the housing, in order to achieve regulation of the liquid flow, is very small and thus enables fast and effortless movement of the inner member, which in turn enables rapid control.

It should be noted that it is possible to have a plural more or less independent groups of ports, provided that within each group the ports are distributed equally such that relief of resultant forces is obtained. For example a first group may have two ports spaced apart by 180°, i.e. diagonally. A second group may have two other ports that are spaced apart by 180°, i. e. diagonally. The position of the ports of the first group with respect of the second group is then optional. I.e. they need not all be positioned equally spaced.

The outer surface of the inner member and the inner surface of the housing may have any suitable configuration such as e.g. a polygonal cross-section. With a non-circular cross-section axial movement is used to control the liquid flow.

It is, however most preferred that these surfaces have circular cross-section since this configuration has the advantage that in particular a rotation, but also an axial movement may be used to control the liquid flow. Possibly both a rotational and an axial movement can be performed during the actuation of the inner member.

A rotational movement has the advantage that the operation of the device may be altered from zero flow to full flow or vice versa solely by a rotation of the inner member of less that one revolution. It is also possible to use a simple but accurate rotational actuator for providing the inner member with a rotational movement with respect to the housing.

It should be clear for the person skilled in the art that the housing could be moved with respect of a fixed inner member, but this is more complicated and therefore not preferred.

The possibility of also providing the inner member with an axial movement results in even more flexible control possibilities.

The inner member is preferably provided with an axial outlet. This has the advantage that axial forces tending to keep the inner member in position acts upon the inner member. It also allows an uncomplicated and easily controlled flow path through the regulating device.

The inner member may be arranged to be actuated by a stepping motor. This has the advantage that a very quick and accurate setting of the regulating device may be obtained at the same time as this kind of rotational actuator is inexpensive and easy controlled. As a preferred alternative the actuator is a servo motor.

The ports and the apertures may have a shape that provides a substantially constant relative change in opening areas from one setting position to an adjacent setting position. This has the advantage that a substantially linear regulation of the flow, from zero flow to full flow, and pressure may be obtained.

BRIEF DESCRIPTION OF THE DRAWINGS

Further advantages are obtained with further aspects of the invention which will be apparent from the following description of embodiments with reference to the annexed drawings.

DETAILED DESCRIPTION OF PREFERRED EMBODIMENTS

Figure 1:
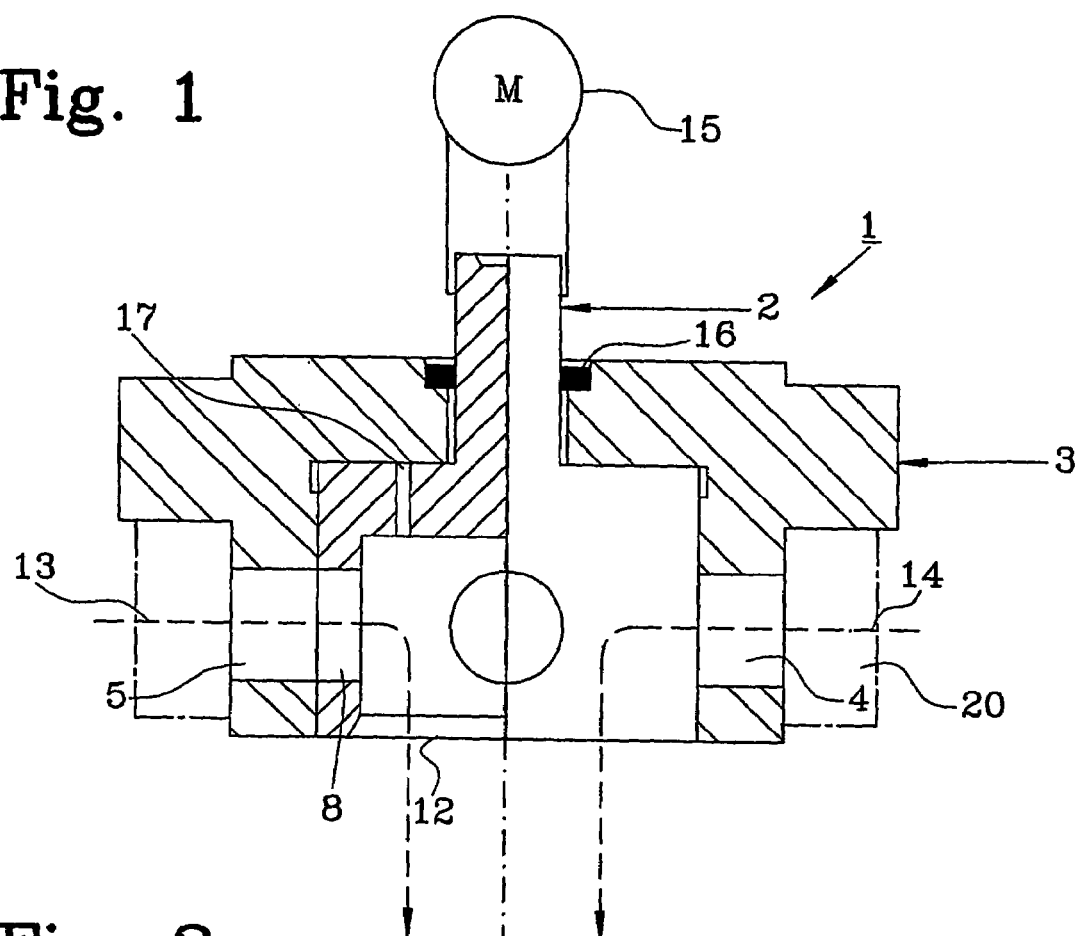
FIG. 1 shows an axial sectional view through a regulating device according to the present invention.
Figure 2A:
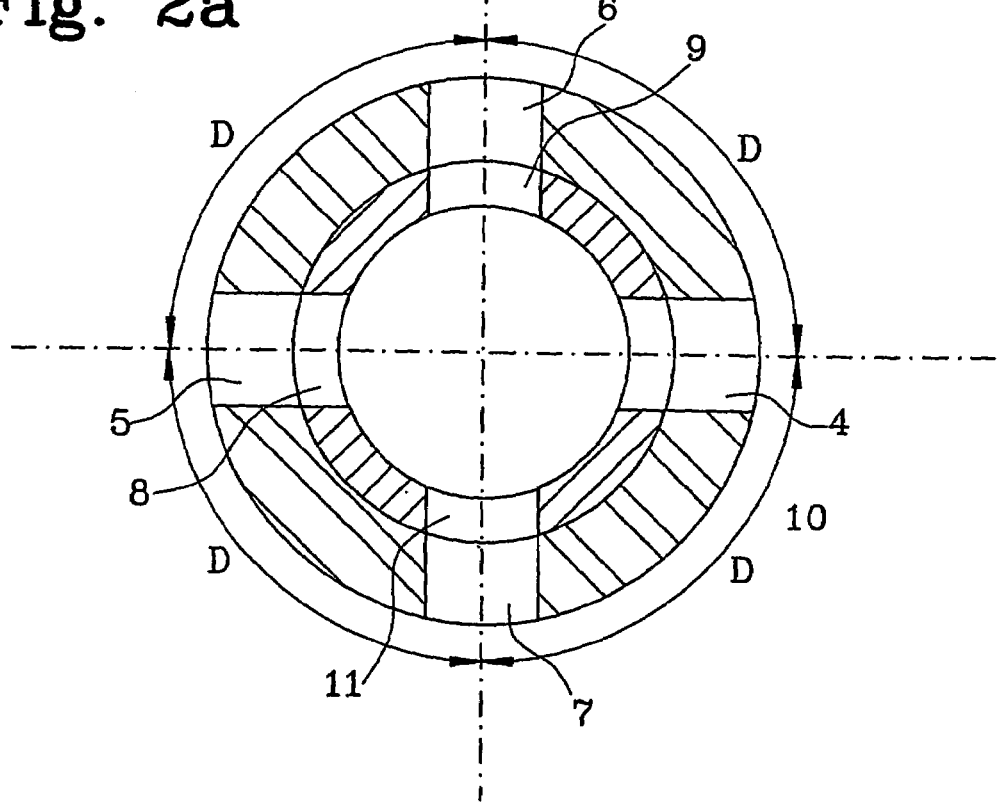
FIGS. 2a and 2b show a top view of the valve in FIG. 1.

FIG. 1 shows a regulating device 1 according to the present invention. The regulating device comprises a valve spindle or an inner member 2 and a valve housing 3. The housing 3 is provided with an inlet in the form of ports, spaced apart with a circumferentially equal distance D (shown in. FIG. 2a). Two, 4, 5, are indicated in FIG. 1.

The inner member 2 is provided with a passage in the form of apertures 8 (only one is indicated), positioned in correspondence with the ports 4, 5. As can be seen in FIG. 2a the inner member 2 and the housing 3 are provided with four apertures 8, 9, 10, 11 and ports 4, 5, 6, 7, respectively. The inner member 2 is further provided with an axial outlet 12.

In operation, hydraulic liquid flows along the paths designated as 13 and 14 in the figure, that is, from the outside of the housing 3 via the ports and apertures into the inside of the inner member 2 and further out through the axial outlet 12. Provided that equal flow enters the ports, the resulting radial force acting on the inner member will become substantially zero.

This together with the above mentioned floating relationship between the components makes it possible to rotate the inner member using only a small force, which in turn enables that the inner member may be rotated by an accurate low-power stepping motor 15, shown in FIG. 1.

The use of a stepping motor has the advantage that the position of the ports and the apertures relative each other may be adjusted in very small steps, and low inertia and low friction ensures that the desired position may be reached in a very short time even when the regulating device is subject to a high and powerful flow.

Figure 2B:
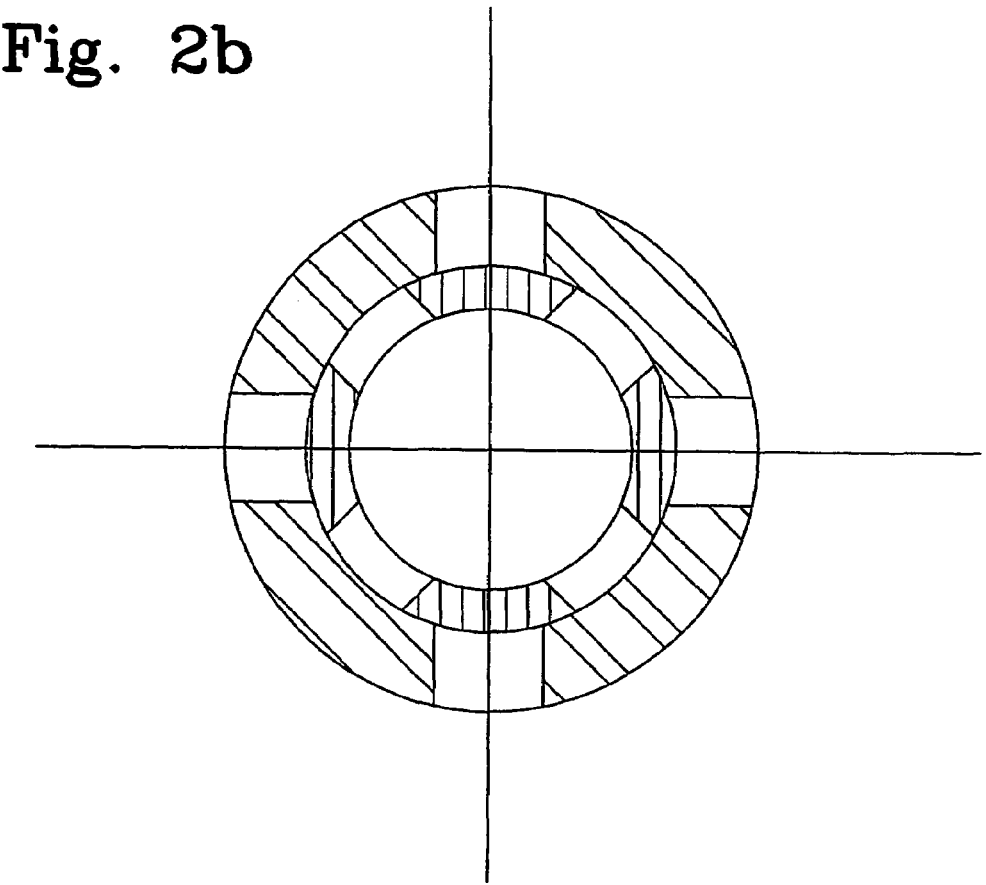

Since the inner member may be rotated with very small but distinct steps, the flow may be set with high accuracy. Only as en example, the flow may set in an interval from virtually 0 liters/minute (with the relative positions of the ports and the apertures set as shown in FIG. 2b, i.e. with no mutual correlation) to as an example 600 liters/minute (with the relative positions of the ports and the apertures set as shown in FIG. 2a, i.e. with full mutual correlation) in steps of 0.5 liters/minute, thus enabling great options in setting the regulating device to a desired flow. Even smaller steps are of course possible if it is necessary for the application. Smaller or greater maximal flows are of course also within the scope of the invention.

As mentioned above, the criteria for obtaining a radially relieved inner member is that the flows entering the inner member from opposite apertures are equal. This may be accomplished in several ways. For example, the liquid originating from a liquid source may be led into an equalising chamber before the liquid flow enters the ports, thus allowing the liquid to distribute evenly between the ports, which results in opposite forces with a resultant force that is substantially zero.

Such an equalising chamber is indicated with dotted lines and depicted 20 in FIG. 1, and is defined by an annular space surrounding the housing at the outside of the ports 4, 5. The liquid source may be connected radially from the outside to this equalising chamber. Other designs are of course possible. Distribution of the liquid by e.g. an equalising chamber also has the advantage that a single flow source, such as a hydrostatic pump, may be used.

If the inner member needs to be axially sealed off, this may be accomplished with only a low pressure sealing, depicted in FIG. 1 with reference numeral 16.

The inner member may also be provided with a channel 17 in its upper portion, which provides lubrication of the upper surface of the inner member and also counter-acts axial forces, originating from the flow through the outlet and acting on the inner member in a direction opposite to the discharge flow through the outlet 12, tending to excessively press the inner member onto a meeting surface inside the housing.

In operation of the embodiment shown in FIG. 1 there is normally a small leakage of liquid in the slit between the inner member and the housing. This leakage provides the floating relationship and lubricates the contact surfaces of the inner member and the housing, which facilitates rotation of the inner member.

The leakage will, however, be negligible compared to the flows through the port and apertures and thus does not in practice affect the accuracy of the regulating device. Because of this feature it is possible to produce the housing and the inner member without having to observe narrow tolerances, since a certain leakage is not only tolerable but also desired.

This is an advantage which enhances the economy of the device. Since of the components being fitted with a chosen play, the device will be virtually unaffected by thermal expansions because of hot liquid and great flows to be regulated. The thermal expansion may well be absorbed within the radial play provided. In case both elements are made from the same material and the thermal impact is the same for them, there will of course be substantially equal thermal expansion for the two elements.

It is, however, also possible to provide the device with a sealing (not shown) for sealing between the cylinder walls of the inner member and the housing if it is desired in a particular application. This sealing in the form of a sealing ring may advantageously be located near the lower end, as seen in FIG. 2a, to provide lubrication of largest possible meeting surfaces.

In FIGS. 1 and 2 the ports and the apertures have been shown as having a circular cross-section. The ports and/or the apertures may however have the shape of a polygon, such as a square or a right-angled triangle or another shape. In a preferred embodiment however, at least a portion of the respective ports and apertures have such cross-sections that the relative change in opening areas from a setting step to an adjacent setting step is constant. This may be expressed as:

$$\frac{dA}{A} = C, \tag{1}$$

where C is a constant, A is the area passing flow and dA is the area change.

Figure 3:
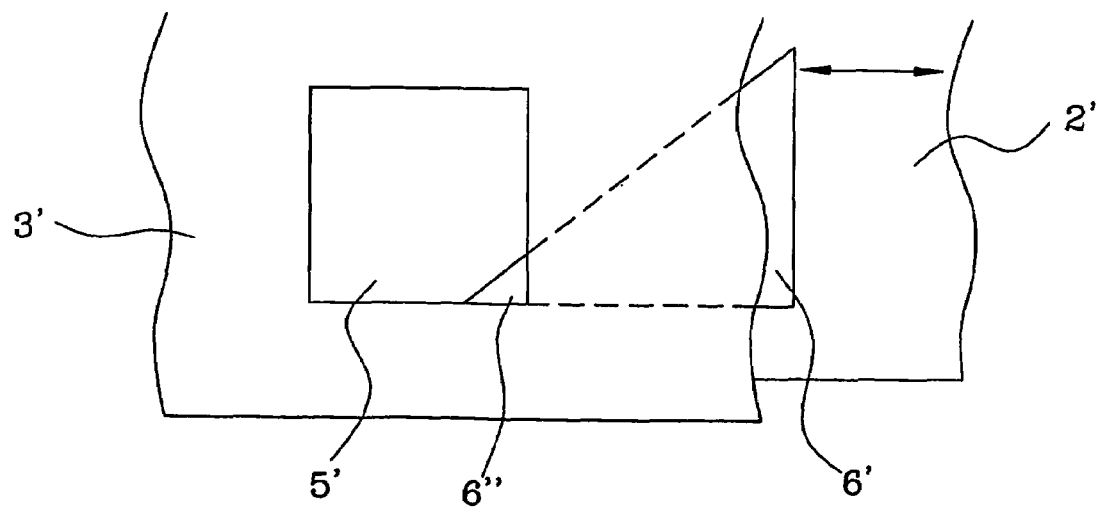
FIG. 3 shows another embodiment of ports and apertures of the regulating device.

An example of such a construction is shown in the detail figure of FIG. 3 where only one port and one aperture is shown. In the housing 3' is provided a rectangular port 5', whereas in the inner member 2' there is provided a triangular aperture 6'. A rotational movement of the inner member 2' at the beginning of the opening of the path through the free area defined by the aggregated opening of the holes defined by the port 5' and the aperture 6' opens the triangular path area indicated with 6".

This makes it clear that fine adjustment is easily achievable by forming the ports and apertures adequately. The person skilled in the art appreciates that different configurations of the ports and the apertures may be envisaged. One example is to provide the housing with a triangular port and the inner member with a rectangular aperture.

The advantage with such an arrangement is thus that a very high or low relative change at the end and/or beginning of a regulating process can be avoided. This would otherwise have presented difficult regulating problems. Instead a smooth adjustment may be easily accomplished in these regions.

Figure 4:
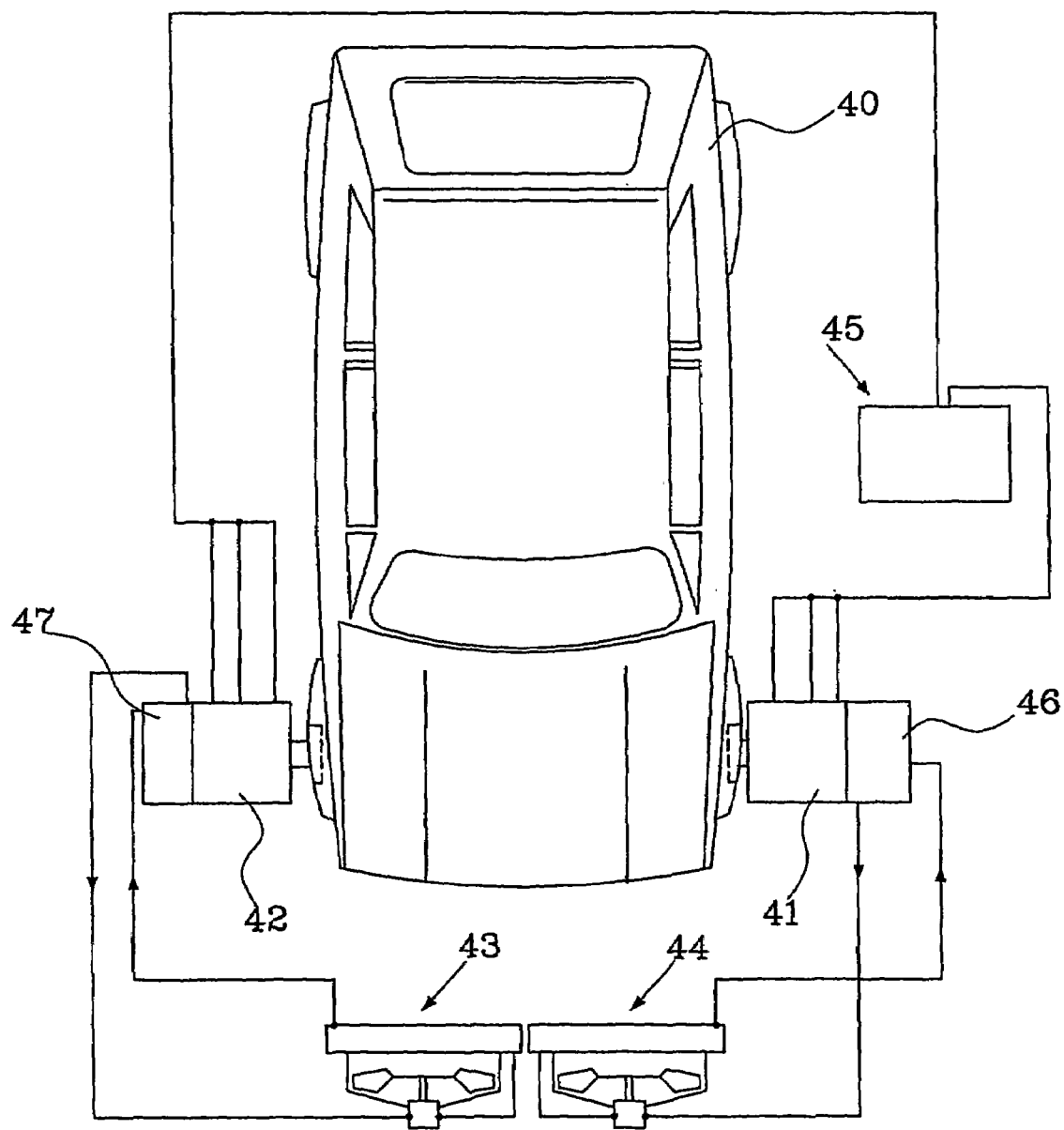
FIG. 4 shows the present invention applied in a dynamometer testing device.

FIG. 4 shows the regulating device installed in a dynamometer testing system where it is advantageously utilised. The system is connected to a vehicle 40 and comprises a pair of test units 41, 42. A pair of cooling units 43, 44 having hydrostatically driven cooling fans is connected to the test units. A measuring and control system is depicted with 45. The two assemblies formed by the two test units 41, 42 and the respective associated cooling units 43, 44 are connected to the common measuring and control system 45.

Each test unit 41, 42 comprises a dynamometer in the form of a hydrostatic pump assembly 46, 47 provided with means for measuring the torque applied to the pump input shaft, which is arranged to be rigidly connected to a drive shaft of the vehicle 40.

Each pump assembly 46, 47 comprises two commonly driven pumps connected to a tank. A portion of the liquid flow produced by the pump assembly is passed to a hydrostatic motor driving a fan of the cooling unit and then through a cooler of the cooling unit and back to the tank. The remaining portion is passed to the tank through a control valve.

By employing the invention in a dynamometer testing device several important advantages are achieved:

small liquid flows an pressure can be accurately regulated
great liquid flows and pressure can be accurately regulated
the vehicle can be tested during rapid accelerations
tests can be performed at outgoing shaft rotation speeds from at least as low as 50 rpm to at least as high as 3000 rpm
a simple but accurate rotational actuator can be employed
the cost of the regulating device as well as the entire testing device can be held low The regulating device according to the present invention is advantageously used as the control valve. The per se known features of the operation of the dynamometer testing system shown in FIG. 4 is described in more detail in the European patent EP 0 210 979 and therefore not further described here.

Apart from the advantages with the system disclosed therein, the regulating speed of the present invention enables that the system may be used for very fast processes such as rapid accelerations.

There are numerous other applications in which the present invention may be used. For example, the regulating device according to the present invention may be used for common hydraulic applications, for control of a retarder for a motor vehicle, for speed control of hydraulically powered vehicles, for flow regulation in a hydro power generator (enabling frequency control without electronic circuitry), for thermostatic control of liquid carrying heat and cooling systems (accurate control of large flows) in buildings, industries, laboratories and district heating systems, for control of wave generating systems and fountains.

In the above description the regulating device has been described with four ports and apertures in one group. The number of ports and apertures may however be two, three or any other integer as long as the ports and the apertures are circumferentially spaced apart with an equal distance in each group. As has been indicated above, it is not excluded that ports and apertures belonging to a plural of groups be used.

Figure 5A:
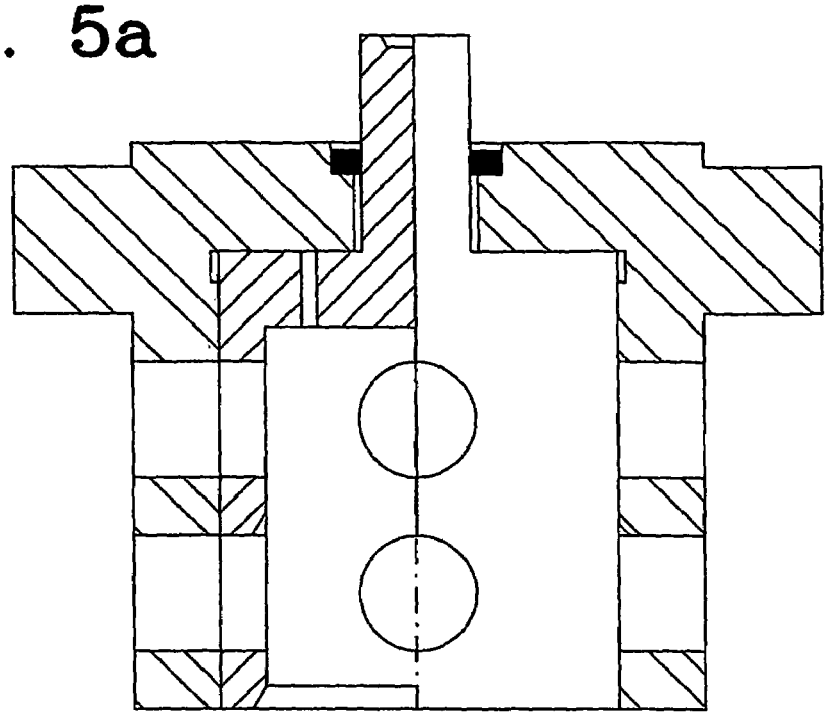
FIGS. 5a and 5b show alternative embodiments of the present invention.
Figure 5B:
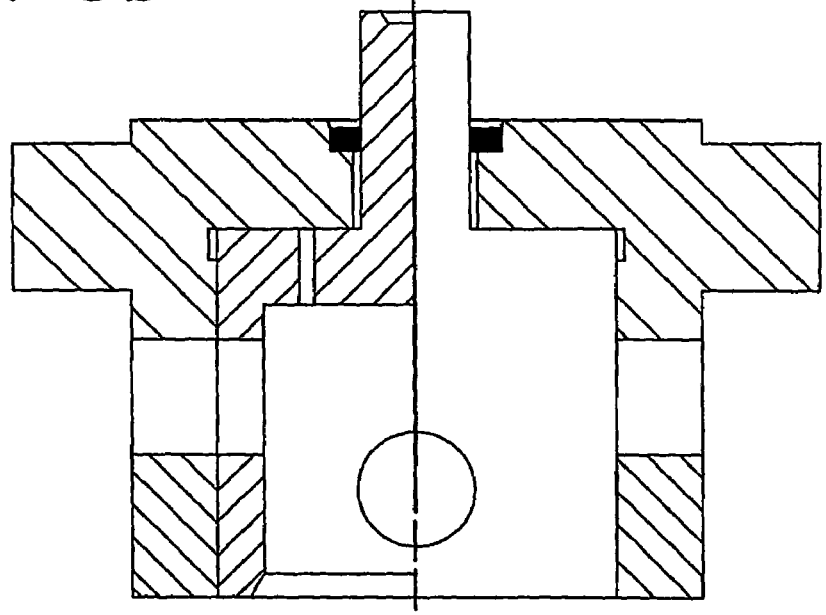

The apertures and ports may further be axially displaced as long as the resulting radial force is substantially zero. Examples of this are shown in FIGS. 5a and 5b. In both these two cases the ports and apertures are shown having also an axial separation.

In the above description the inner member has been described with an axial outlet. This outlet, however, may as well as the inlet consist of apertures and corresponding ports in the cylindrical wall instead of the axial outlet. As long as this radial outlet consists of apertures and ports that are circumferentially spaced apart with an equal distance the advantages of the present invention is retained.

In such a case it is clear for the person skilled in the art that inlet and outlet are separated, for example with the aid of an inlet manifold in the form of a first annular chamber and a discharge collector in the form of a second annular chamber.

With this embodiment both inlet and outlet may be used to control the regulating device which may be advantageous in some applications. It is not excluded that the regulation device solely controls at the outlet.

In case there is no provision for rotation of the inner member with respect to the housing, e. g. their sections are not circular, the displacement provided is axial, effected e.g. by a suitable linear actuator.

The invention claimed is:

1. Regulating device for control of liquid flow and/or pressure, including a housing having an axis and a circumferential extension, and being provided with an inlet and an outlet and enclosing an inner member which is arranged to be movable by means of an actuator relative to the housing and provides a passage for regulated liquid flow, characterised in that the inlet comprises at least one group of at least two substantially radial ports which are spaced apart with a circumferentially equal distance, and that the passage comprises a number of radial apertures, each positioned correspondingly with respect to each port, that the inner member is fitted with a minor radial play inside the housing so that in operation a minor leakage of the liquid to be regulated will enter a slit between the inner member and the housing, whereby the inner member is substantially relieved from radial forces in operation.

2. The regulating device according to claim 1, characterised in that the outer surface of the inner member and the inner surface of the housing have circular cross-section.

3. The regulating device according to claim 1, characterised in that the inner member is provided with an axial outlet.

4. The regulating device according to claim 1, characterised in that the ports and the apertures are arranged to be brought in and out of correspondence with each other by rotational and/or axial movement of the inner member with respect to the housing.

5. The regulating device according to claim 1, characterised in that as an actuator for the inner member is chosen one of: a stepping motor, a servo motor.

6. The regulating device according to claim 1, characterised in that the ports and the apertures have a shape resulting in a substantially constant relative change in opening areas from a setting position to an adjacent setting position such that, for at least a portion of the respective ports and the apertures, the opening area for liquid flow path is expressed as:

$$\frac{dA}{A} = C, \qquad (1)$$

where C is a constant, A is the area passing flow and dA is the area change.

7. The regulating device according to claim 1, characterised in that the inner member is substantially shaped as a circular cylinder.

8. The regulating device according to claim 1, characterised in that a sealing is provided between the inner member and the housing.

9. The regulating device according to claim 1, characterised in that an equalising camber is positioned upstream the ports.

10. The regulating device according to claim 9, characterised in that the equalising chamber surrounds the housing in the region of the ports.

11. The device for dynamometer testing of motor vehicles, comprising a dynamometer having a hydrostatic pump assembly provided with means for measuring the torque applied to a pump input shaft, characterised in that it includes a regulating device according to claim 1 for controlling the pump.

12. The arrangement for controlling liquid flow or pressure including at least one regulating device according to claim 1, wherein the arrangement is one of the group: a device for control of hydraulic fluid, a retarder for a motor vehicle, a speed control device for hydraulically powered vehicles, a flow regulator for a hydro power generator, a device for thermostatic control of liquid carrying heat and cooling systems in buildings, industries, laboratories and district heating systems, a device for control of wave generating systems, a fountain device.

* * * * *